(12) United States Patent
Qiao et al.

(10) Patent No.: US 10,585,529 B2
(45) Date of Patent: Mar. 10, 2020

(54) SELECTING CORRELATION REFERENCE BASED ON NOISE ESTIMATION

(71) Applicant: Microsoft Technology Licensing, LLC, Redmond, WA (US)

(72) Inventors: Tianzhu Qiao, Portland, OR (US); Jonathan Westhues, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/594,128

(22) Filed: May 12, 2017

(65) Prior Publication Data
US 2018/0129351 A1 May 10, 2018

Related U.S. Application Data

(60) Provisional application No. 62/417,973, filed on Nov. 4, 2016.

(51) Int. Cl.
*G06F 3/041* (2006.01)
*G06F 3/044* (2006.01)
(Continued)

(52) U.S. Cl.
CPC ...... *G06F 3/04182* (2019.05); *G06F 3/03545* (2013.01); *G06F 3/044* (2013.01);
(Continued)

(58) Field of Classification Search
CPC . G06F 2203/04108; G06F 3/041–0412; G06F 3/0416–04186; G06F 3/03545; G06F 3/044–0448; G06F 2203/0384
See application file for complete search history.

(56) References Cited

U.S. PATENT DOCUMENTS

| 8,854,030 B2 | 10/2014 | Martens et al. |
| 8,866,792 B2 | 10/2014 | Wang et al. |

(Continued)

FOREIGN PATENT DOCUMENTS

| CN | 105045426 A | 11/2015 |
| EP | 2264568 A2 | 12/2010 |

(Continued)

OTHER PUBLICATIONS

"International Search Report and Written Opinion Issued in PCT Application No. PCT/US2017/058930", dated Feb. 7, 2018, 10 pages.

(Continued)

*Primary Examiner* — David Tung
(74) *Attorney, Agent, or Firm* — Alleman Hall; Creasman & Tuttle LLP (57) ABSTRACT

Examples are disclosed herein that relate to reducing noise in received signals. An example provides a method comprising receiving, via one or more electrodes of an input device, a capacitive signal, for each of two or more reference sequences designed for a respective capacitive signal condition, correlating the capacitive signal with the reference sequence, and identifying a particular one of the two or more reference sequences that produced a highest noise immunity when correlated with the capacitive signal. The method may further comprise correlating the identified reference sequence with a subsequent capacitive signal to thereby receive information in the subsequent capacitive signal regarding an input device condition.

19 Claims, 8 Drawing Sheets

(51) Int. Cl.
*G06F 3/0354* (2013.01)
*G06F 3/038* (2013.01)

(52) U.S. Cl.
CPC .......... *G06F 3/0418* (2013.01); *G06F 3/0441* (2019.05); *G06F 3/0442* (2019.05); *G06F 3/04164* (2019.05); *G06F 2203/0384* (2013.01); *G06F 2203/04108* (2013.01)

(56) References Cited

U.S. PATENT DOCUMENTS

| 8,874,396 B1* | 10/2014 | Olson ..................... G06F 3/044 345/173 |
|---|---|---|
| 8,878,797 B2 | 11/2014 | Erdogan et al. |
| 8,947,373 B2 | 2/2015 | Kremin et al. |
| 2011/0122096 A1 | 5/2011 | Kim et al. |
| 2012/0013565 A1 | 1/2012 | Westhues et al. |
| 2012/0293430 A1 | 11/2012 | Kitada |
| 2013/0176272 A1 | 7/2013 | Cattivelli et al. |
| 2016/0004357 A1 | 1/2016 | Westhues et al. |
| 2016/0170506 A1 | 6/2016 | Westhues et al. |
| 2016/0239123 A1* | 8/2016 | Ye .......................... G06F 3/0416 |
| 2017/0060337 A1* | 3/2017 | Kim ...................... G06F 3/0412 |
| 2017/0123519 A1* | 5/2017 | Reitan ................. G06F 3/03545 |

FOREIGN PATENT DOCUMENTS

| KR | 20140010714 A | 1/2014 |
|---|---|---|
| WO | 2014145827 A2 | 9/2014 |

OTHER PUBLICATIONS

Smith, Steven W., "Properties of Convolution / Correlation", http://web.archive.org/web/20060612220950/http://www.dspguide.com/ch7/3.htm, Published on: Jun. 21, 2006, 3 pages.

* cited by examiner

SELECTING CORRELATION REFERENCE BASED ON NOISE ESTIMATION

CROSS REFERENCE TO RELATED APPLICATIONS

This application claims priority to U.S. Provisional Patent Application No. 62/417,973 filed Nov. 4, 2016, the entirety of which is hereby incorporated herein by reference.

BACKGROUND

Some devices enable the reception of user input by performing capacitive sensing. A touch sensor, for example, may detect changes in capacitance to identify the presence of a human digit. The touch sensor may also communicate with an active stylus via capacitive signaling. However, capacitive signals received by both the touch sensor and active stylus may include noise from the surrounding environment, proximate display devices and power supplies, and/or other sources.

DETAILED DESCRIPTION

As described above, some devices enable the reception of user input by performing capacitive sensing. A touch sensor, for example, may identify the presence of a human digit by detecting changes in capacitance caused by the proximity of the human digit to the touch sensor. The touch sensor may also communicate with an active stylus via capacitive signaling. In one example of bi-directional communication, the touch sensor may transmit capacitive signals that enable the stylus to determine its position relative to the touch sensor, and may receive capacitive signals from the stylus regarding stylus state (e.g., battery level, button state). However, capacitive signals received by both the touch sensor and stylus may include significant levels of noise, which may unacceptably corrupt information embedded in the signals.

A variety of sources may cause noise in capacitive signaling. Such sources may include mains power systems, radio and/or television broadcasts, switch mode power supplies, and display devices (e.g., when in proximity to, or integrated with, a touch sensor). Due to the prevalence of these and other noise sources, and their resultant signal attenuation, various approaches to reducing noise in capacitive signaling have been developed.

In one implementation, a reference sequence designed for specific noise sources and/or noise conditions is employed in a correlation-based approach to capacitive sensing. In correlation-based approaches, a received signal is correlated (e.g., via the cross-correlation function) with the reference sequence, yielding an output reflective of the received signal. The output may be a number that is compared to a threshold to determine whether an input mechanism is proximate to a touch sensor, for example. The reference sequence may be designed to address noise in a particular frequency band such that, when correlated with a signal that includes noise in the frequency band, such noise is reduced in the correlation output. However, noise reduction is limited to the frequency band(s) for which the reference sequence was designed. Moreover, the reference sequence is typically designated prior to its use during run-time operation—e.g., it is fixed during the design-time of a device using the reference sequence. As such, correlations using the reference sequence cannot adapt to the generally dynamic nature of noise in typical use environments. While the reference sequence may provide desired noise reduction under some operating conditions, insufficient noise reduction may result under others. Similar limitations may be associated with the use of a touch sensor excitation sequence (e.g., time-varying voltage) as a reference sequence, particularly if noise resides in the frequency band(s) of the excitation sequence.

Accordingly, implementations are disclosed herein for reducing noise in capacitive signals by identifying a reference sequence that produces a highest noise immunity among two or more reference sequences when correlated with a capacitive signal. The identified reference sequence may then be correlated with a subsequent capacitive signal to thereby receive information in the subsequent capacitive signal. The information in the subsequent capacitive signal may be obtained with a reduced level of noise relative to approaches in which a reference sequence designated prior to run-time operation is used without an assessment of its noise immunity. In this way, signal correlation can dynamically adapt during device run-time and perform correlations using a reference sequence most suited for the instant noise conditions. As described in further detail below, the identification of a reference sequence producing a highest noise immunity in a correlation may be performed at a touch sensor and/or an active stylus.

Figure 1:
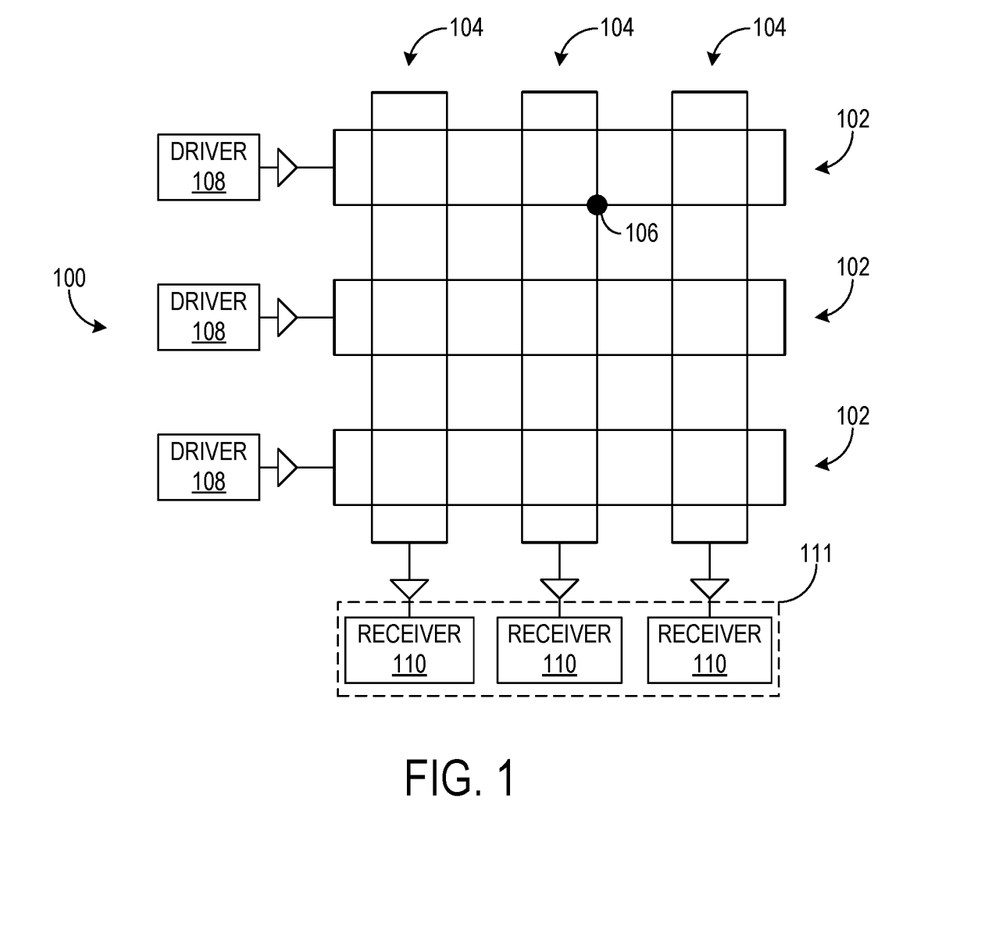
FIG. 1 shows an example touch sensor.

FIG. 1 shows an example capacitive touch sensor 100. Touch sensor 100 is one example of an input device at which reference sequence noise immunity can be assessed to reduce noise in capacitive signals received at the touch sensor. Touch sensor 100 includes a plurality of electrodes in the form of transmit rows 102 vertically spaced from receive columns 104. Each vertical intersection of transmit rows 102 with receive columns 104 forms a corresponding node such as node 106 whose electrical properties (e.g., capacitance) may be measured to detect touch and/or other inputs. Touch sensor 100 thus represents a mutual capacitance approach to touch sensing, in which a relative electrical property between electrodes is analyzed. While three transmit rows 302 and three receive columns 304 are shown in FIG. 1 for simplicity, touch sensor 100 may include any suitable number of transmit rows and receive columns, which may be on the order of one hundred or one thousand, for example.

Each transmit row 102 is coupled to a respective driver 108 configured to drive the corresponding transmit row with an excitation sequence. An excitation sequence may take the form of a time-varying voltage that, when digitally sampled, includes a sequence of pulses. The sequence of pulses may include binary values (e.g., 0 or 1, 1 or −1), or three or more values in other implementations. When applied to a transmit row 102, the excitation sequence may induce currents at one or more receive columns 104 in locations corresponding to the nodes between the transmit rows and receive columns. As the currents may be proportional to the capacitance of their corresponding nodes, measurement of the currents may enable measurement of their corresponding capacitances. Currents induced on a receive column—and on other electrodes configured to receive induced current described herein—are referred to herein as "capacitive signals", and may be analyzed to assess node capacitance and thereby detect touch input, among other potential operations. To this end, each receive column 104 is coupled to a respective receiver 110. As described in further detail below with reference to FIG. 4, each receiver 110 may include circuitry for sampling capacitive signals and correlating the capacitive signals with reference sequences to identify a particular reference sequence with a highest noise immunity. The set of receivers 110 in touch sensor 100 is collectively designated receive logic 111.

In some implementations, the driving of transmit rows 102 and receiving at receive columns 104 described above may be performed in a time-sequential manner. For example, each transmit row 102 in touch sensor 100 may be sequentially driven, with resultant capacitive signals being received at all receive columns 104 for each driven transmit row. Receive columns 104 may be held at a constant voltage (e.g., ground) while the capacitive signals are received. A complete scan of all transmit rows 102 may be referred to herein as a "touch frame", though in other examples a touch frame may refer to driving a subset of the transmit rows and/or receiving at a subset of receive columns 104. As described in further detail below, capacitive signals may be received at receive columns 104 while transmit rows 102 are not driven during non-drive periods of operation of touch sensor 100. Such capacitive signals may be analyzed to determine noise conditions in selecting a reference sequence with desired noise immunity.

It will be understood that touch sensor 100 is provided as an example and may assume other forms and modes of operation. For example, while a rectangular grid arrangement is shown in FIG. 1, the electrodes may assume other geometric arrangements (e.g., a diamond pattern, mesh). Alternatively or additionally, the electrodes may assume nonlinear geometries—e.g., curved or zigzag geometries, which may minimize the perceptibility of display artifacts (e.g., aliasing, moiré patterns) caused by occlusion of an underlying display by the electrodes. Further, while touch sensor 100 is described herein as including electrodes oriented as horizontal transmit rows 102 and vertical receive columns 104, any suitable orientation may apply. For example, electrode rows instead may be oriented vertically (e.g., as columns), with electrode columns being oriented horizontally (e.g., as rows). Other orientations, including non-rectilinear orientations, are also possible. As another example, one or more electrodes may be oriented at oblique angles relative to horizontal and/or vertical axes.

Figure 2:
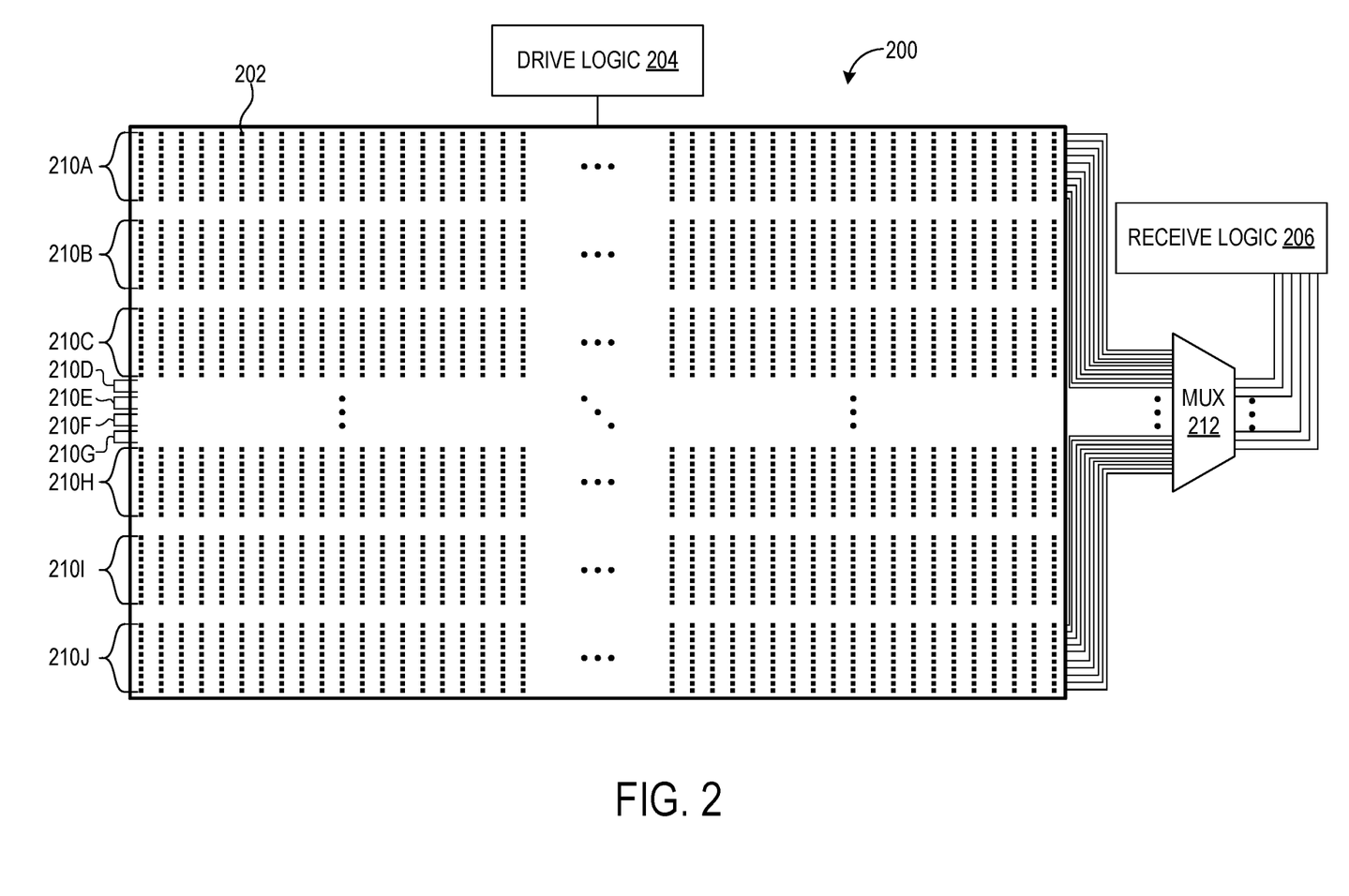
FIG. 2 shows an example in-cell touch sensor.

As another example of an input device at which reference sequence noise immunity can be assessed to reduce noise in capacitive signals, FIG. 2 shows an example in-cell touch sensor 200. Touch sensor 200 may be integrated with a display device such that one or more components of the integrated touch-sensitive display device are configured for both display output and input sensing functions. As a particular example in which the display device is a liquid crystal display (LCD) device, the same physical electrical structure may be used both for capacitive sensing and for determining the field in the liquid crystal material that rotates polarization to form a displayed image. Alternative or additional components may be employed for display and input sensing functions, however. Further, implementations are contemplated in which touch sensor 200 is configured as an on-cell touch sensor (e.g., disposed directly on a display device), or as neither an on-cell touch sensor nor an in-cell touch sensor.

Touch sensor 200 includes a plurality of electrodes (e.g., electrode 202), each of which are configured to detect touch and/or other inputs by receiving capacitive signals. The plurality of electrodes is referred to herein as a plurality of "sensels", for example with reference to in-cell and on-cell implementations. To enable sensel charging and the reception of resulting output, the sensels are operatively coupled to drive logic 204 and receive logic 206. Via drive logic 204, each sensel may be selectively driven with an excitation sequence, and, via receive logic 206, charge induced by such driving is analyzed to perform input sensing. Touch sensor 200 thus represents a self-capacitance approach to touch sensing, in which the electrical properties of a sensel itself are measured, rather in relation to another electrode in the touch sensor. In addition to the induced currents in touch sensor 100 described above, charge accumulated on a sensel is another example of a capacitive signal that may be correlated with a reference sequence to identify an input mechanism, assess noise conditions, and/or perform other operations.

Due to the relatively large number of sensels included in a typical implementation of touch sensor 200, a limited number of sensels are shown in FIG. 2 for simplicity/clarity. Examples described below contemplate a particular configuration in which touch sensor 200 includes 20,000 sensels—e.g., when implemented in a large-format display device. Touch sensor 200 may include any suitable number of sensels, however.

In an example such as that referenced above with 20,000 sensels, the sensels may be arranged in 100 rows and 200 columns. While it may be desirable to maximize sensing frequency by simultaneously measuring capacitance at each sensel, this would entail provision of significant processing and hardware resources. In particular, 20,000 receivers in receive logic 206 would be needed to perform full-granularity, simultaneous self-capacitance measurements at each sensel. As such, partial-granularity, multiplexed approaches to self-capacitance measurement may be desired to reduce the volume of receive logic 206. Specifically, as described below, receive logic capable of servicing only a portion of the touch sensor at one time may be successively connected to different portions of the touch sensor over the course of a touch frame, via time multiplexing, in order to service the entirety of touch sensor 200.

FIG. 2 illustrates one example approach to partial-granularity self-capacitance measurement in touch sensor 200. In this approach, the sensels are grouped into horizontal bands 210A-210J, each having ten rows of sensels. Self-capacitance measurements are temporally multiplexed via a multiplexer 212, with a respective measurement time slot in a touch frame being allocated for each band 210. Accordingly, receive logic 206 may include a number of receivers equal to the number of sensels in a given band 210—e.g., 2,000 receivers. For example, the receivers may be connected to one band in a first time slot, then to another in the next time slot, and so on. It will be appreciated that the above groupings, bands, number of sensels, etc. reflect but one of many possible implementations. Different numbers of sensels may be employed; shapes and arrangements of groupings may differ from the depicted example; etc. Further, similar multiplexing may be applied in driving the plurality of sensels, such that the sensels are arranged in subsets which are each driven in a corresponding time slot of a touch frame.

Touch sensor 200 may employ a variety of drive modes to effect sensel operation. In one drive mode, all sensels may be driven to perform input sensing, which may simplify drive logic 204. Further, drive logic 204 may apply a single excitation sequence during a drive mode, differing excitation sequences during the drive mode, or may employ multiple drive modes with differing excitation sequences.

In some implementations, touch sensor 200 may selectively operate in a "full search" mode and a "local search" mode. Full search refers to operations, within the course of a single touch frame, that cause the entirety of touch sensor 200 to be scanned for inputs. Local search refers to performing an operation for only a portion of touch sensor 200 in a touch frame. The full search may identify a location of an input mechanism (e.g., human digit, active stylus). For example with reference to the multiplexing scheme described above, the full search may identify one of the bands 210 in which the input mechanism resides (and/or an x/y location of the input mechanism). For some types of input mechanisms, identification of this band may prompt further processing in the form of a local search in the band. For an active stylus, touch sensor 200 may use at least a portion of the local search to listen for transmissions from the stylus, such as transmissions regarding stylus state information (e.g., firmware version, battery level, button state, tip force/pressure, identification information). In this way, touch sensor 200 may reduce the processing resources and power expended to facilitate interaction with the stylus. In some examples, touch sensor 200 may receive stylus transmissions in multiple local searches within a touch frame in the band 210 identified by a full search, thereby increasing a stylus scan/communication rate and reducing stylus interaction latency.

While the identification of a band 210 having stylus presence via a single full search may prompt local searching in that band, in other implementations local searching may occur after full searches are conducted in every band, such that the results of full searching across the entirety of touch sensor 200 are considered before searching locally. Alternatively or in addition to receiving stylus transmissions, touch sensor 200 may perform a local search to update the location of an input mechanism relative to its previously determined location in a prior full search, as the input mechanism may move between full and local searches. Still further, for examples in which full searching reveals a coarse or less accurate location of an input mechanism, local searching may refine the coarse location determined via full searching.

In some examples, an active stylus may be configured to interact with touch sensor 200. To determine its position relative to the touch sensor, the active stylus may receive capacitive signals induced by output from the touch sensor. When operated in a drive mode in which a common excitation sequence is applied to the entirety of touch sensor 200, however, the active stylus may be unable to determine its location relative to the touch sensor, as the touch sensor appears the same across its surface. Accordingly, touch sensor 200 may employ a drive mode in which two or more different excitation sequences are applied to the plurality of sensels. As a particular example with reference to the multiplexing scheme described above, touch sensor 200 may apply a respective excitation sequence to each band 210. This may allow the active stylus to determine the particular band 210 to which it is proximate, and in response, transmit a locating sequence to touch sensor 200. Touch sensor 200 may then receive the locating sequence and perform local searching in its band 210 to determine the specific x/y coordinate of the active stylus in the band.

Figure 3:
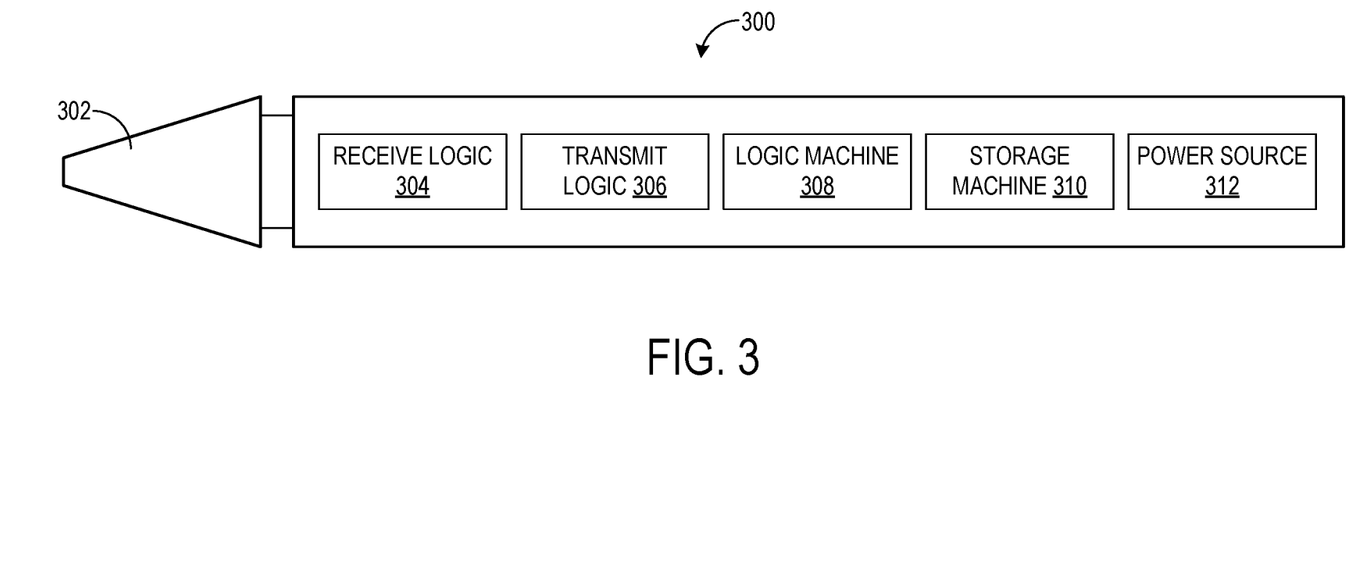
FIG. 3 shows an example active stylus.

As another example of an input device at which reference sequence noise immunity can be assessed to reduce noise in capacitive signals, FIG. 3 shows an example active stylus 300. Stylus 300 may interact with touch sensor 100 and/or touch sensor 200, for example. To this end, stylus 300 includes an electrode tip 302 through which capacitive signals may be transmitted and/or received, for example in the form of electrostatic fields. Capacitive signals received through electrode tip 302 may be routed to receive logic 304, which may correlate the capacitive signals with a reference sequence to receive touch sensor communications, assess noise conditions, and/or perform other operations. When configured for interaction with a touch sensor (e.g., touch sensor 200) that transmits multiple excitation sequences to enable spatial differentiation of the surface of the touch sensor by stylus 300, receive logic 304 may (e.g., simultaneously) correlate capacitive signals with reference sequences designed for each excitation sequence.

Stylus 300 further includes transmit logic 306 for transmitting capacitive signals. In particular, transmit logic 306 may cause the application of an excitation sequence to electrode tip 302, which may induce a capacitive signal at a proximate touch sensor. A logic machine 308 executes instructions held by a storage machine 310 to effect the approaches described herein. A power source 312, such as a battery, provides power to the components of stylus 300. Alternative or additional components not shown in FIG. 3 may be included in stylus 300, including but not limited to one or more buttons, an electrode end, one or more electrodes arranged in the stylus body, and a force sensor for determining force associated with deflection of electrode tip 302.

Figure 4:
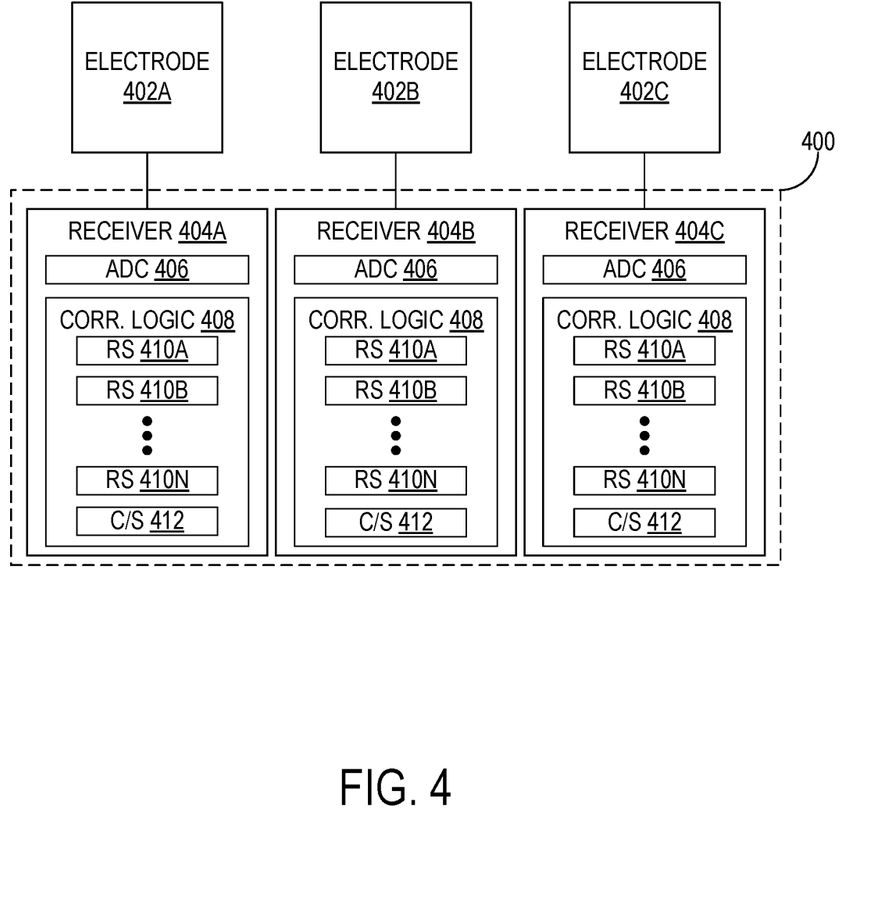
FIG. 4 shows an example implementation of receive logic.

In view of the above, the present systems and method implement receive logic to sample and correlate capacitive signals to determine reference sequence noise immunity. Such receive logic may be implemented in a touch sensor, active stylus or other input device. FIG. 4 shows an example implementation—receive logic 400—configured to sample and correlate capacitive signals. Receive logic 400 may be implemented in touch sensor 100 (e.g., as receive logic 111), touch sensor 200 (e.g., as receive logic 206), and/or active stylus 300 (e.g., as receive logic 304). In the depicted example, receive logic 400 is coupled to three electrodes 402A-C. When implemented in a touch sensor, electrodes 402A-C may be some of the electrodes included in the touch sensor, whereas, when implemented in an active stylus, receive logic may be configured with only one of electrodes 402A-C, with the others being omitted. When implemented in active stylus 300, for example, receive logic 400 may be configured for coupling only with electrode 402A, which may correspond to electrode tip 302. Receive logic 400 may be coupled to any suitable number of electrodes, however, including multiple electrodes in an active stylus.

Each electrode 402 is coupled to a respective receiver 404 so that received capacitive signals can be sampled and correlated with reference sequences. To this end, each receiver 404 includes an analog-to-digital converter (ADC) 406 for sampling capacitive signals. ADCs 406 may perform sampling by generating a sequence of bits from an analog capacitive signal, for example. Each receiver 404 further includes correlation logic 408 for correlating a sampled capacitive signal with multiple reference sequences. FIG. 4 shows the inclusion of a number n of reference sequences 410A-N in correlation logic 408, where n may assume any suitable integer value. As described in further detail below, each reference sequence 410 is designed for a respective capacitive signal condition. Thus, correlating a capacitive signal with two or more reference sequences 410 may enable the identification of a particular reference sequence most suited to the instant capacitive signal conditions to which receive logic 400 is subjected. In other words, a preferred reference sequence may be selected for future use. More particularly, following selection, correlation logic 408 may correlate subsequent capacitive signals with the identified reference sequence. This may increase the SNR of correlation output, to thereby reduce receive-side noise-induced error.

Assessment of reference sequences 410 may be carried out in various ways. In one example, correlation logic 408 of each receiver 404 is configured to perform a single correlation with a corresponding reference sequence 410 at any given time, such that a respective time slot is provided for each correlation of reference sequences 410A-N. In another example, two or more receivers 404 may be coupled to an electrode 402 to enable multiple simultaneous correlations for capacitive signals received at that electrode. In yet another example, multiple simultaneous correlations may be performed across different electrodes 402. In particular, receiver 404A coupled to electrode 402A may perform a correlation using reference sequence 410A during a time slot, and receiver 404B coupled to electrode 402B may perform a correlation using reference sequence 410B during the same time slot. Due to the spatial proximity of electrodes 402A and 402B, it may be assumed that capacitive signals received at each electrode are of sufficiently negligible difference relative to each other to enable their treatment as a common capacitive signal. This may also be the case for time multiplexing as well—i.e., when capacitive signals are correlated close in time, particularly at the same or spatially proximate electrodes, they may be treated as a common capacitive signal. In simultaneous correlations with multiple electrodes, the above example may be extended to three or more spatially proximate electrodes, and/or non-adjacent electrode groupings that are still considered spatially proximate. When implemented in this manner, the provision of a reference sequence in a spatially proximate electrode group may not be duplicated—i.e., the reference sequence employed by one electrode in the group may not be available to any other electrode in the group. Implementations in which reference sequences are shared among the electrode group are contemplated, however.

Figure 5:
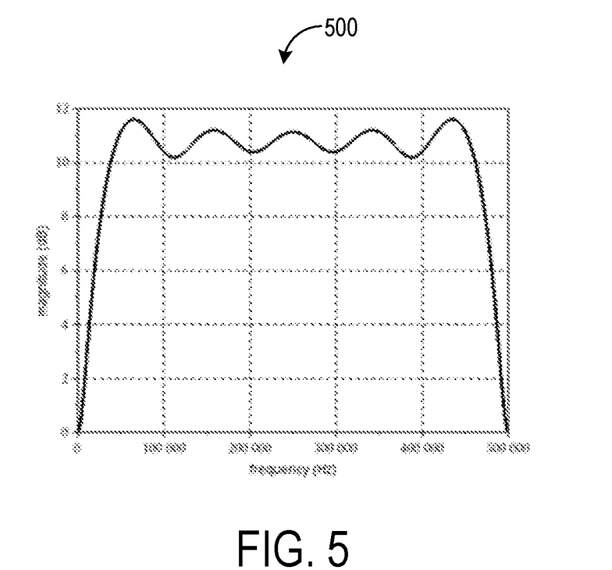
FIG. 5 shows a frequency response of an example synchronization sequence.

As described above, each reference sequence 410 may be designed for a respective capacitive signal condition. A capacitive signal condition may relate to noise. For example, a capacitive signal condition for which a reference sequence 410 is designed may include a frequency band in which the reference sequence is designed to reduce noise. To illustrate reference sequence design in this manner, FIG. 5 shows a frequency response 500 of an example synchronization sequence. The synchronization sequence may be a sequence transmitted by a touch sensor for reception by an active stylus that enables the stylus to gain knowledge of the timing of a touch frame scanning sequence of the touch sensor, for example. Though suitable for synchronization, the sequence may not sufficiently reduce noise in a particular frequency band; as shown in FIG. 5, frequency response 500 of the synchronization sequence is relatively flat between 50 kHz and 450 kHz. When digitally sampled, the synchronization sequence may comprise the following bits: {0, 0, 0, 1, 1, 1, 0, 1, 1, 0, 1}.

Figure 6:
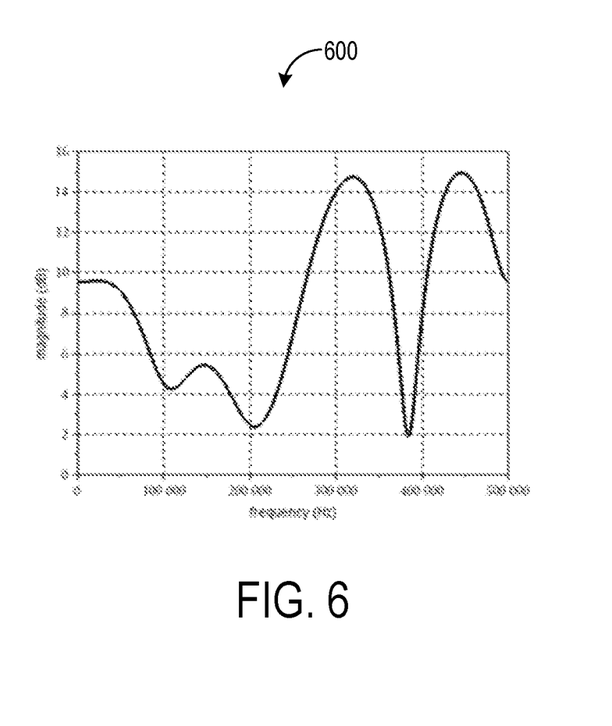
FIG. 6 shows a frequency response of an example reference sequence.

In contrast, FIG. 6 shows a frequency response 600 of an example reference sequence designed to reduce noise in a particular frequency band. As shown, frequency response 600 is relatively minimal at around 200 kHz and 380 kHz, and as such may reduce noise in this range. Relative to the sequence of FIG. 5, the reference sequence may suppress noise at around 200 kHz by approximately 8 dB with a signal loss of 1.74 dB when correlated with signals having such noise, resulting in an increased SNR of 6.2 dB.

With resumed reference to FIG. 4, an assessment of the instant noise conditions affecting receive logic 400 may be made to identify a reference sequence 410 most suited for those conditions. Receive logic 400 may assess this via treating a received capacitive signal as indicative of instant noise conditions. To this end, reception of the capacitive signal may be timed to occur during a pre-determined period having a lower expected SNR (e.g., below a threshold SNR). Capacitive signals received during such periods may include sufficient levels of noise to enable their accurate assessment, without unacceptable corruption from desired signals—e.g., a desired signal strength may be sufficiently weak so as to be unmeasurable or may be less than a threshold strength. One approach involves assessment during a period in which electrodes of the touch sensor are not actively driven. This may ensure, or increase the likelihood, that the received capacitive signal is primarily or more strongly influenced by instant noise conditions. As described in further detail below with reference to FIGS. 7 and 8, the period during which a noise-dominant capacitive signal is received may correspond to non-drive periods of a touch sensor. In a similar approach in the case of reference sequence assessments at an active stylus, assessment may be performed when the stylus is sufficiently spaced away from electrodes of a touch sensor that are driven. Accordingly, receive logic 400 may assess noise conditions using a capacitive signal induced during both times in which a touch sensor is not driven, and at times in which the touch sensor is driven.

One or more of reference sequences 410 may be designed based on an excitation sequence used to drive a capacitive touch sensor, alternatively or in addition to being designed for a respective capacitive signal condition. The excitation sequence may be used to drive transmit rows 102 of touch sensor 100 and/or the sensels of touch sensor 200, for example. Reference sequences 410 may be designed based on the excitation sequence such that, each reference sequence differs from the excitation sequence by a single corresponding value. The value with which each reference sequence 410 differs from the corresponding value of the excitation sequence may be different for each reference sequence. As an example, a function that generates a set of reference sequences designed in this manner based on a binary excitation sequence $s_0$ may assume the following form: $s_k(i)=s_0(i)$ for $i \neq k$, and $s_k(i)=1-s_0(i)$ otherwise. This function generates a number k of reference sequences with a single bit differing from a corresponding bit of the excitation sequence $s_0$, where the index of the single differing bit is successively increased as the index i is increased by one. With $s_0=\{0, 0, 0, 1, 1, 1, 0, 1, 1, 0, 1\}$, for example, the function generates $s_1=\{1, 0, 0, 1, 1, 1, 0, 1, 1, 0, 1\}$, $s_2=\{0, 1, 0, 1, 1, 1, 0, 1, 1, 0, 1\}$, and so on. Another example generating function may, for each reference sequence, flip the sign of a respective bit, for an excitation sequence so that assumes values of 1 or −1. Regardless of the nature of their generation, reference sequences designed based on an excitation sequence may inherently address noise in certain frequency bands, by virtue of reducing their response to those bands during the generation process.

Other approaches to generating reference sequences are contemplated. The above bit-altering approach may instead alter two or more bits. Further, the use of non-binary excitation and/or reference sequences is contemplated. In these examples, one or more values of a reference sequence may be changed relative to their corresponding values of an excitation sequence. Still further, different reference sequence waveforms may be used in correlations, including but not limited to in-phase and quadrature sinusoids. In yet other examples, reference sequence generation may include dynamic determination of a reference sequence during run-time operation. For example, noise conditions assessed via capacitive signal correlation with two or more reference sequences may indicate frequency band(s) in which noise could be more thoroughly reduced with a reference sequence designed for those band(s). Receive logic 400, or an external controller, for example, may dynamically determine reference sequences during run-time in this manner. As such, "designed" as used herein regarding a reference sequence designed for some condition may refer to design both during design-time or during run-time operation.

With reference sequences 410 chosen in any suitable manner, correlation logic 408 may correlate a capacitive signal with each reference sequence. The correlations may assume any suitable form, such as that of a cross-correlation or any other appropriate correlation mechanism. In some implementations, receivers 404 may include components for computing the correlation of all references as a combined correlation value. Further, correlation logic 408 may divide a capacitive signal into two or more time bands and correlate each band of the capacitive signal with each reference sequence 410. Such an approach may be utilized in the presence of impulse noise, for example. In this example, bands of the capacitive signal with noise above a threshold may be discarded (e.g., by setting corresponding values of reference sequences 410 to zero). Reference sequences 410 modified in this manner may be retained in correlations with subsequent capacitive signals.

After receiving a capacitive signal as described above, the contemplated systems/methods identify and select a particular reference sequence 410 that produces a highest noise immunity. For example, the identified reference sequence 410 may be the one, relative to the others, that is the least correlated with noise in the capacitive signal. For some correlation functions (e.g., cross-correlation), the identified reference sequence 410 may be that with the lowest correlation value, for example. In this way, the particular reference sequence 410 that is most orthogonal and uncorrelated to noise in the capacitive signal can be identified. For examples in which correlation is performed against an excitation sequence, the particular reference sequence 410 that is most uncorrelated to noise but highly correlated with the excitation sequence may be identified.

With the particular reference sequence 410 having the highest noise immunity to instant noise conditions identified, correlation logic 408 may correlate the reference sequence with a capacitive signal that is subsequent to the capacitive signal that was used to identify the reference sequence. In other words, the preferred reference sequence is selected for upcoming input detection. Indeed, the subsequent capacitive signal may include information regarding an input device condition, such as information regarding a location of an active stylus (e.g., active stylus 300) relative to a touch sensor (e.g., touch sensor 100 or 200). For example, receive logic 400 may be implemented in the touch sensor to identify the reference sequence 410 with the highest noise immunity, and then use it to receive capacitive signals from an active stylus to ascertain its location, such as the locating sequence transmitted by active stylus 300 described above. For examples in which receive logic 400 is implemented in the active stylus, the preferred reference sequence 410 may be used by the stylus to gain knowledge of the timing of a touch frame scanning sequence of the touch sensor, and/or to ascertain its location, via a sequence transmitted by the touch sensor, or one or more sequences transmitted by respective bands (e.g., bands 210) of the touch sensor. When configured for interaction with a touch sensor that transmits respective excitation sequences for each band, the active stylus may include a respective receiver for each band, with each receiver being configured to perform correlations using a respective reference sequence for each band.

In some examples, each reference sequence 410 may be evaluated to determine whether that reference sequence meets a noise immunity threshold when correlated with a capacitive signal (e.g., noise-dominant/non-drive period signal). If a reference sequence 410 does not meet the noise immunity threshold in such a correlation, an excitation sequence may be used in correlations with subsequent capacitive signals that carry information regarding an input device condition. Such an example may be reflective of scenarios in which no alternate reference sequence 410 can reduce noise to a desired degree, and the excitation sequence is used as a fallback mechanism for detection.

To identify and select a preferred reference sequence 410, FIG. 4 shows the inclusion of a comparator/selector 412 in each receiver. Using receiver 404A as an example, comparator/selector 412 may receive the output associated with each reference sequence 410A-N, and may identify the particular reference sequence with the highest noise immunity. Comparator/selector 412 may then cause receiver 404A to utilize the identified reference sequence 410 in performing correlations with subsequent capacitive signals. The comparison of reference sequences 410 with a noise immunity threshold may also be carried out by comparator/selector 412.

Figure 7:
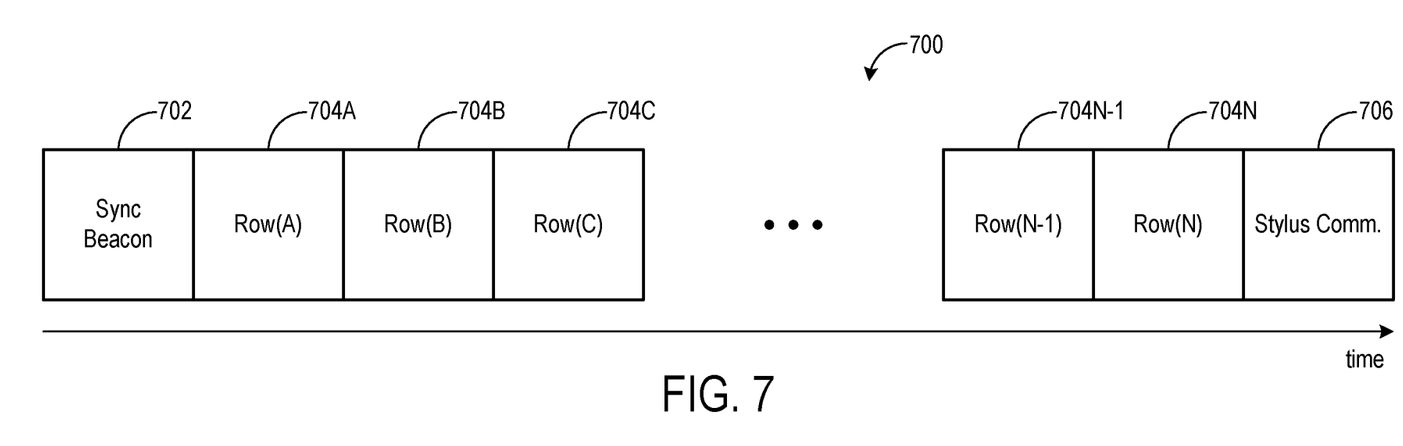
FIG. 7 shows an example touch frame of a touch sensor.

As described above, the methods/systems herein may be structured so that receive logic 400 samples capacitive signals when it is expected that they will be dominated by noise (and free of desirable signal). When employed in connection with a touch sensor, the capacitive signal may be selected in view of touch sensor operation. To illustrate such selection, FIG. 7 shows an example touch frame 700 of a touch sensor configured with transmit rows and receive columns, such as touch sensor 100 of FIG. 1. Touch frame 700 begins with the transmission of a synchronization beacon 702 by the touch sensor for reception by an active stylus, such as active stylus 300 of FIG. 3. As described above, the synchronization beacon enables the active stylus to acquire knowledge regarding the timing of touch frame 700 and the touch scanning sequence at the touch sensor, which may enable the determination of stylus location and reception of stylus transmissions. Sequential driving 704A-N of each transmit row of the touch sensor follows until all transmit rows A-N have been driven (with corresponding reception occurring at one or more receive columns). At the end of touch frame 700, a stylus communication subframe 706 occurs, in which transmissions from the active stylus may be received at the touch sensor (e.g., communication of tip pressure, battery levels, etc). During subframe 706, all receive columns may be held at a fixed voltage, with driving of the transmit rows being suppressed.

As the capacitive signals induced at active stylus 300, when proximate to the touch sensor during subframe 706, may be reflective of noise conditions and relatively free of the influence of transit row operation, the active stylus may sample such noise conditions using capacitive signals induced during the subframe. Such periods in which transmit row operation is suppressed are referred to herein as "non-drive" periods, whereas periods in which the transmit rows are driven are referred to herein as "drive" periods. Thus, in this example the active stylus is configured to operate according to touch frame 700 by performing correlations with reference sequences and a capacitive signal during one or more non-drive periods. It will be understood, however, that the touch sensor may perform its own noise sampling during such non-drive periods.

Figure 8:
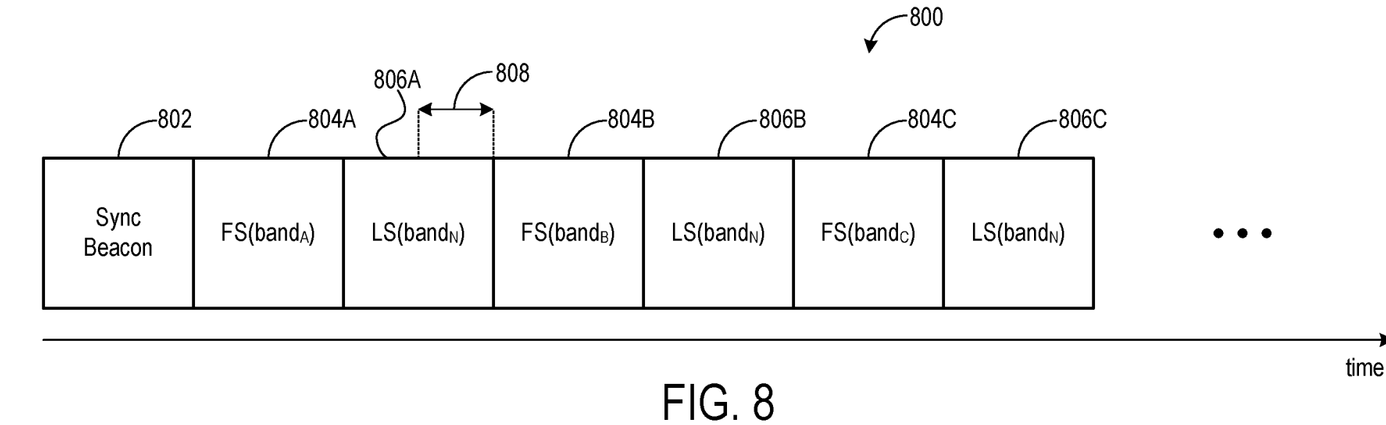
FIG. 8 shows another example touch frame of a touch sensor.

As another example, FIG. 8 shows an example touch frame 800 of a touch sensor configured for self-capacitance sensing with a plurality of sensels, such as touch sensor 200 of FIG. 2. Touch frame 800 begins with a synchronization beacon 802 configured to synchronize the touch sensor with an active stylus as described above. Beacon 802 is followed by a full search 804A in a band A of the touch sensor, in which the location of an input mechanism in the form of a touch sensor band and/or x/y coordinate is identified as described above. Identification of the location prompts a local search 806A in the identified band to receive transmissions from the input mechanism (alternatively or in addition to updating and/or refining the input mechanism location) in the band. Subsequent full searches 804B and 804C, which respectively prompt local searches 806B and 806C are also performed, as may be additional full and/or local searches in one or more of the other bands of the touch sensor.

During some non-drive periods in touch frame 800, the touch sensor may suppress driving of the sensels—for example, such periods may be allocated to the reception of capacitive signals from an active stylus. FIG. 8 depicts one such example, in which a portion 808 of local search 806A is designated a non-drive period for listening for stylus transmissions. During portion 808, the active stylus—or the touch sensor—may sample noise conditions based on capacitive signals received during this portion.

In some scenarios, noise sampling may be sufficiently free of influence by electrode driving of desired signals even during one or more drive periods. For example, the active stylus may be positioned away from a subset of driven electrodes (e.g., sensels, transmit rows) such that less than a threshold portion of a capacitive signal received by an active stylus or touch sensor is induced by the driving of the subset of electrodes. In this case, and with knowledge of the subset of driven electrodes, the active stylus or touch sensor may sample noise conditions during such drive periods with some measure of confidence that received signal is predominantly noise-influenced.

Due to the dynamic nature of noise conditions in typical use environments, the noise conditions to which an input device is subjected may change during operation. As such, receive logic of the input device may be configured to sample instant noise conditions at different times. In some examples, noise conditions may be sampled every nth frame of a touch frame sequence—e.g., every fifth touch frame 700 or 800. For every nth frame, the receive logic may (1) receive a capacitive signal via one or more electrodes, (2) identify a particular reference sequence that produces a highest (or sufficiently high) noise immunity when correlated with the capacitive signal, and (3) correlate the identified reference sequence with a subsequent capacitive signal in a frame subsequent to the nth frame—e.g., an n+mth frame—to thereby receive information in the subsequent capacitive signal regarding an input device condition. In other examples, the receive logic may vary the frequency at which noise conditions are sampled (e.g., in response to changes in the noise conditions) and/or the period during frames in which noise conditions are sampled. Further, the receive logic may average noise conditions determined across one or more frames to determine an average noise condition, which may be used to identify a reference sequence with highest noise immunity.

The duration for which a reference sequence having a highest noise immunity is used in correlations with capacitive signals may vary with noise conditions. For example, if noise associated with an initial capacitive signal in a frame N used to identify a noise-immune reference sequence remains relatively constant for M additional frames, the noise-immune reference sequence may be used in correlations with subsequent capacitive signals in the M additional frames. For more transient noise—e.g., impulse noise described above—selection of a noise-immune reference sequence may occur for each frame, as noise characteristics may change on a frame-to-frame basis. In view of the above, a reference sequence may be correlated with a noise-dominant capacitive signal (to identify a noise-immune reference sequence) in the same touch frame as being correlated with a subsequent capacitive signal carrying desired information (to receive the desired information). Alternatively or additionally, correlation of the reference sequence with the noise-dominant capacitive signal and subsequent capacitive signal may occur in different touch frames.

Figure 9:
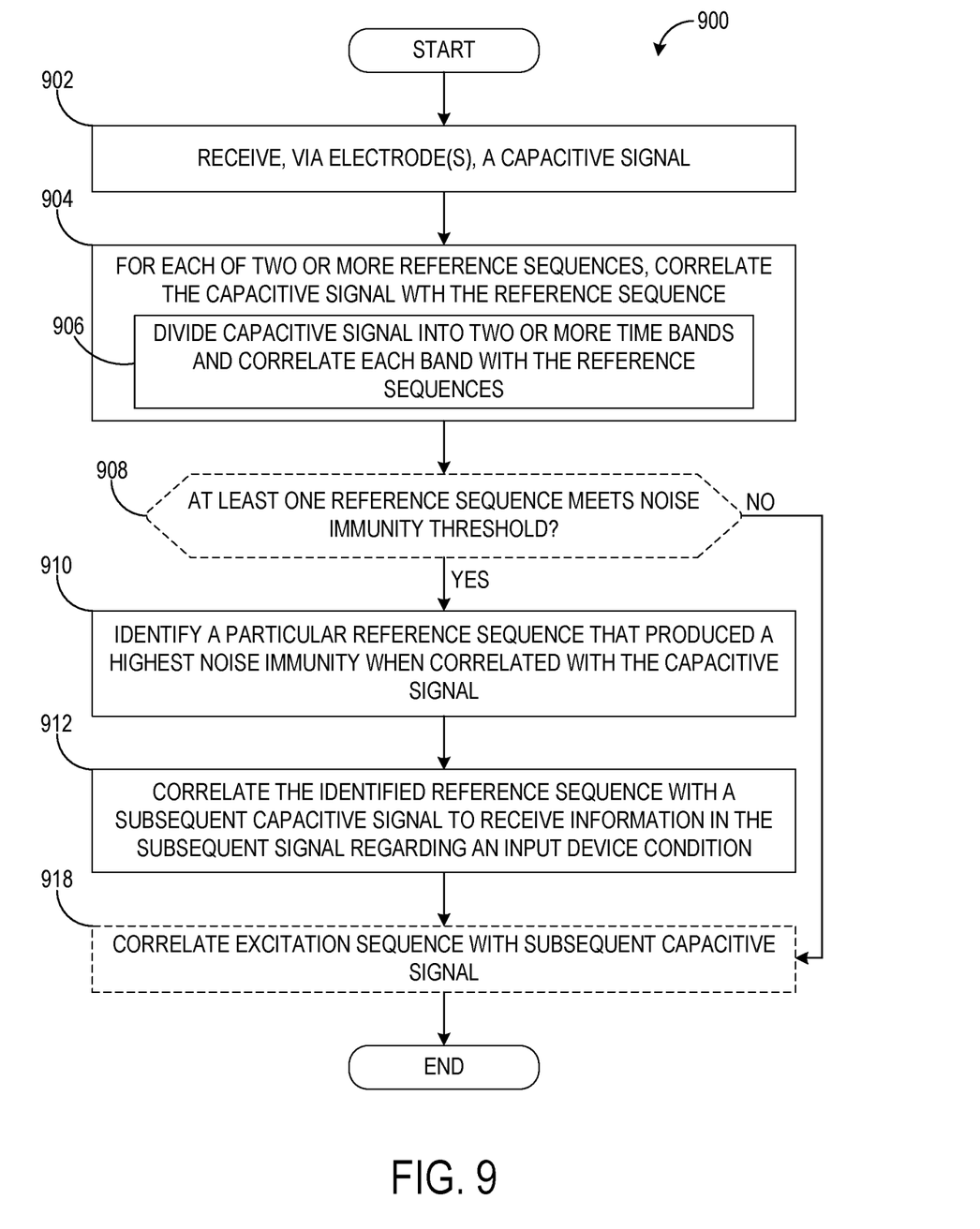
FIG. 9 shows a flowchart illustrating an example method of reducing noise in received signals at an input device.

FIG. 9 shows a flowchart illustrating an example method 900 of reducing noise in received signals at an input device. Method 900 may be implemented by touch sensor 100 of FIG. 1, touch sensor 200 of FIG. 2, active stylus 300 of FIG. 3, and/or receive logic 400 of FIG. 4, for example.

At 902, method 900 includes receiving, via one or more electrodes of the input device, a capacitive signal. The input device may be a mutual capacitance touch sensor, a self-capacitance touch sensor, or an active stylus. The one or more electrodes may be elongate receiving electrodes (e.g., FIG. 1), point-location electrodes (e.g., in the in-cell implementation of FIG. 2), or an electrode tip, for example. The capacitive signal may be induced during a period in which a touch sensor is operated in a non-drive period, in which electrode driving of the touch sensor is suppressed. Alternatively, the capacitive signal may be induced during a period in which a subset of electrodes of the touch sensor are driven, and the input device/one or more electrodes is/are positioned away from the subset of electrodes such that less than a threshold portion of the capacitive signal is induced by the driving of the subset of electrodes. The capacitive signal may be reflective of the instant noise conditions to which the input device is subjected.

At 904, method 900 includes, for each of two or more reference sequences designed for a respective capacitive signal condition, correlating the capacitive signal with the reference sequence. As indicated at 906, the capacitive signal may be divided into two or more time bands, and each time band of the capacitive signal may be correlated with each of the two or more reference sequences. Each reference sequence may differ from the excitation sequence by a single corresponding bit. The input device may operate according to a touch-sensing frame including one or more drive periods for detecting an input device condition and one or more non-drive periods, where correlating the two or more reference sequences with the capacitive signal may be performed during the one or more non-drive periods. The respective capacitive signal condition may include a respective frequency band in which the reference sequence is designed to reduce noise.

At 908, method 900 optionally includes determining whether at least one of the two or more reference sequences meets a noise immunity threshold. If it is determined that at least one of the two or more reference sequences meets a noise immunity threshold (YES), method 900 proceeds to 910. If it is determined that none of the two or more reference sequences meets a noise immunity threshold (NO), method 900 proceeds to 918.

At 910, method 900 includes, identifying a particular one of the two or more reference sequences that produced a highest noise immunity when correlated with the capacitive signal. The identified reference sequence may be least correlated with noise in the capacitive signal among the two or more reference sequences.

At 912, method 900 includes correlating the identified reference sequence with a subsequent capacitive signal to thereby receive information in the subsequent capacitive signal regarding an input device condition. The information received in the subsequent capacitive signal may include information regarding a location of an active stylus relative to the touch sensor, information regarding a location of the active stylus relative to a capacitive touch sensor, and/or a synchronization beacon transmitted from a capacitive touch sensor indicating a timing of a touch scanning sequence at the touch sensor.

At 918, in response to determining at 908 that none of the two or more reference sequences meets a noise immunity threshold, method 900 optionally includes correlation an excitation sequence used to drive a capacitive touch sensor with the subsequent capacitive signal.

Method 900 may be repeated every Nth frame of a touch scanning sequence. For example, method 900 may include, for every Nth frame of the touch scanning sequence, (1) receiving, via the one or more electrodes of the input device, a capacitive signal in the Nth frame; (2) identifying a particular one of the two or more reference sequences that produced a highest noise immunity when correlated with the capacitive signal in the Nth frame; and (3) correlating the identified reference sequence with a subsequent capacitive signal in a frame subsequent to the Nth frame to thereby receive information in the subsequent capacitive signal in the subsequent frame regarding an input device condition.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
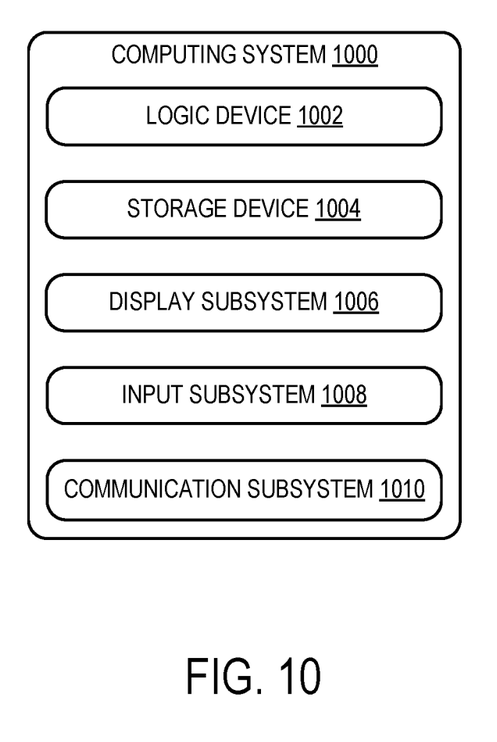
FIG. 10 shows a block diagram of an example computing device.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1002 executing instructions held by storage machine 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

Another example provides, at an input device, a method of reducing noise in received signals comprising receiving, via one or more electrodes of the input device, a capacitive signal, for each of two or more reference sequences designed for a respective capacitive signal condition, correlating the capacitive signal with the reference sequence, identifying a particular one of the two or more reference sequences that produced a highest noise immunity when correlated with the capacitive signal, and correlating the identified reference sequence with a subsequent capacitive signal to thereby receive information in the subsequent capacitive signal regarding an input device condition. In such an example, the input device alternatively or additionally may be a capacitive touch sensor. In such an example, the information received in the subsequent capacitive signal alternatively or additionally may include information regarding a location of an active stylus relative to the touch sensor. In such an example, the input device alternatively or additionally may be an active stylus. In such an example, the information received in the subsequent capacitive signal alternatively or additionally may include information regarding a location of the active stylus relative to a capacitive touch sensor. In such an example, the information received in the subsequent capacitive signal alternatively or additionally may include a synchronization beacon transmitted from a capacitive touch sensor indicating a timing of a touch scanning sequence at the touch sensor. In such an example, the input device alternatively or additionally may be configured to operate according to a touch-sensing frame including one or more drive periods for detecting an input device condition and one or more non-drive periods, and correlating the two or more reference sequences with the capacitive signal may be performed during the one or more non-drive periods. In such an example, the input device alternatively or additionally may be an active stylus, and the capacitive signal may be induced by output from a capacitive touch sensor during a period in which (1) a subset of electrodes of the touch sensor are driven, and (2) the active stylus is positioned away from the subset of electrodes such that less than a threshold portion of the capacitive signal is induced by the driving of the subset of electrodes. In such an example, the respective capacitive signal condition alternatively or additionally may include a respective frequency band in which the reference sequence is designed to reduce noise. In such an example, the identified reference sequence alternatively or additionally may be least correlated with noise in the capacitive signal among the two or more reference sequences. In such an example, the method alternatively or additionally may comprise, in response to determining that none of the two or more reference sequences meet a noise immunity threshold when correlated with the capacitive signal, correlating an excitation sequence used to drive a capacitive touch sensor with the subsequent capacitive signal. In such an example, each reference sequence alternatively or additionally may differ from the excitation sequence by a single corresponding bit. In such an example, the method alternatively or additionally may comprise, for every Nth frame of a touch scanning sequence, receiving, via the one or more electrodes of the input device, a capacitive signal in the Nth frame, identifying a particular one of the two or more reference sequences that produced a highest noise immunity when correlated with the capacitive signal in the Nth frame, and correlating the identified reference sequence with a subsequent capacitive signal in a frame subsequent to the Nth frame to thereby receive information in the subsequent capacitive signal in the subsequent frame regarding an input device condition. In such an example, the method alternatively or additionally may comprise dividing the capacitive signal into two or more time bands, and correlating each time band of the capacitive signal with each of the two or more reference sequences.

Another example provides a receiver coupled to an electrode, the receiver comprising logic configured to receive, via the electrode, a capacitive signal, for each of two or more reference sequences designed for a respective capacitive signal condition, correlate the capacitive signal with the reference sequence, identify a particular one of the two or more reference sequences that produced a highest noise immunity when correlated with the capacitive signal, and correlate the identified reference sequence with a subsequent capacitive signal to thereby receive information in the subsequent capacitive signal regarding an input device condition. In such an example, correlating the two or more reference sequences with the capacitive signal alternatively or additionally may be performed during one or more non-drive periods of a capacitive touch sensor. In such an example, correlating the two or more reference sequences with the capacitive signal alternatively or additionally may be performed while the electrode is positioned away from a driven subset of electrodes of a capacitive touch sensor, such that less than a threshold portion of the capacitive signal is induced by the driving of the subset of electrodes. In such an example, the respective capacitive signal condition alternatively or additionally may include a respective frequency band in which the reference sequence is designed to reduce noise.

Another example provides a capacitive input device configured for sensing an input device condition comprising one or more electrodes, and receive logic coupled to the one or more electrodes, the receive logic configured to receive, via the one or more electrodes of the capacitive input device, a capacitive signal, where such receiving is timed to occur during a pre-determined period having a lower expected signal-to-noise ratio, for each of two or more reference sequences designed for a respective capacitive signal condition, correlate the capacitive signal with the reference sequence, identify a particular one of the two or more reference sequences that produced a highest noise immunity when correlated with the capacitive signal, and correlate the identified reference sequence with a subsequent capacitive signal to thereby receive information in the subsequent capacitive signal regarding the input device condition. In such an example, the capacitive input device alternatively or additionally may be an active stylus, and the information received in the subsequent capacitive signal alternatively or additionally may include a synchronization beacon transmitted from a capacitive touch sensor indicating a timing of a touch scanning sequence at the touch sensor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At an input device, a method of reducing noise in received signals, comprising:
   receiving, via one or more electrodes of the input device, a capacitive signal;
   for each of two or more reference sequences designed for a respective capacitive signal condition, correlating the capacitive signal with the reference sequence;
   identifying a particular one of the two or more reference sequences that produced a highest noise immunity when correlated with the capacitive signal;
   correlating the identified reference sequence with a subsequent capacitive signal to thereby receive information in the subsequent capacitive signal regarding an input device condition; and
   in response to determining that none of the two or more reference sequences meet a noise immunity threshold when correlated with the capacitive signal, correlating an excitation sequence used to drive a capacitive touch sensor with the subsequent capacitive signal.

2. The method of claim 1, where the input device is the capacitive touch sensor.

3. The method of claim 2, where the information received in the subsequent capacitive signal includes information regarding a location of an active stylus relative to the capacitive touch sensor.

4. The method of claim 1, where the input device is an active stylus.

5. The method of claim 4, where the information received in the subsequent capacitive signal includes information regarding a location of the active stylus relative to the capacitive touch sensor.

6. The method of claim 4, where the information received in the subsequent capacitive signal includes a synchronization beacon transmitted from the capacitive touch sensor indicating a timing of a touch scanning sequence at the capacitive touch sensor.

7. The method of claim 1, where the input device is configured to operate according to a touch-sensing frame including one or more drive periods for detecting an input device condition and one or more non-drive periods, and where correlating the two or more reference sequences with the capacitive signal is performed during the one or more non-drive periods.

8. The method of claim 1, where the input device is an active stylus, and
   where the capacitive signal is induced by output from the capacitive touch sensor during a period in which (1) a subset of electrodes of the capacitive touch sensor are driven, and (2) the active stylus is positioned away from the subset of electrodes such that less than a threshold portion of the capacitive signal is induced by the driving of the subset of electrodes.

9. The method of claim 1, where the respective capacitive signal condition includes a respective frequency band in which the reference sequence is designed to reduce noise.

10. The method of claim 1, where the identified reference sequence is least correlated with noise in the capacitive signal among the two or more reference sequences.

11. The method of claim 1, where each reference sequence differs from the excitation sequence by a single corresponding bit.

12. The method of claim 1, further comprising, for every Nth frame of a touch scanning sequence:
    receiving, via the one or more electrodes of the input device, a capacitive signal in the Nth frame;
    identifying a particular one of the two or more reference sequences that produced a highest noise immunity when correlated with the capacitive signal in the Nth frame; and
    correlating the identified reference sequence with a subsequent capacitive signal in a frame subsequent to the Nth frame to thereby receive information in the subsequent capacitive signal in the subsequent frame regarding an input device condition.

13. The method of claim 1, further comprising dividing the capacitive signal into two or more time bands, and correlating each time band of the capacitive signal with each of the two or more reference sequences.

14. A receiver coupled to an electrode, the receiver comprising:
    logic configured to:
       receive, via the electrode, a capacitive signal;
       for each of two or more reference sequences designed for a respective capacitive signal condition, correlate the capacitive signal with the reference sequence;
       identify a particular one of the two or more reference sequences that produced a highest noise immunity when correlated with the capacitive signal; and correlate the identified reference sequence with a subsequent capacitive signal to thereby receive information in the subsequent capacitive signal regarding an input device condition; and in response to determining that none of the two or more reference sequences meet a noise immunity threshold when correlated with the capacitive signal, correlate an excitation sequence used to drive a capacitive touch sensor with the subsequent capacitive signal.

15. The receiver of claim 14, where correlating the two or more reference sequences with the capacitive signal is performed during one or more non-drive periods of the capacitive touch sensor.

16. The receiver of claim 14, where correlating the two or more reference sequences with the capacitive signal is performed while the electrode is positioned away from a driven subset of electrodes of the capacitive touch sensor, such that less than a threshold portion of the capacitive signal is induced by the driving of the subset of electrodes.

17. The receiver of claim 14, where the respective capacitive signal condition includes a respective frequency band in which the reference sequence is designed to reduce noise.

18. A capacitive input device configured for sensing an input device condition, comprising:

one or more electrodes; and receive logic coupled to the one or more electrodes, the receive logic configured to:

receive, via the one or more electrodes of the capacitive input device, a capacitive signal, where such receiving is timed to occur during a pre-determined period having a lower expected signal-to-noise ratio;

for each of two or more reference sequences designed for a respective capacitive signal condition, correlate the capacitive signal with the reference sequence;

identify a particular one of the two or more reference sequences that produced a highest noise immunity when correlated with the capacitive signal;

correlate the identified reference sequence with a subsequent capacitive signal to thereby receive information in the subsequent capacitive signal regarding the input device condition; and in response to determining that none of the two or more reference sequences meet a noise immunity threshold when correlated with the capacitive signal, correlate an excitation sequence used to drive a capacitive touch sensor with the subsequent capacitive signal.

19. The capacitive input device of claim 18, where the capacitive input device is an active stylus, and where the information received in the subsequent capacitive signal includes a synchronization beacon transmitted from the capacitive touch sensor indicating a timing of a touch scanning sequence at the capacitive touch sensor.

* * * * *